United States Patent [19]

Stephenson, III

[11] Patent Number: 5,555,055
[45] Date of Patent: Sep. 10, 1996

[54] CAMERA WITH MANUAL FILM DRIVE CONTROL AND SELF RESETTING REWIND LATCH

[75] Inventor: Stanley W. Stephenson, III, Spencerport, N.Y.

[73] Assignee: Eastman Kodak Company, Rochester, N.Y.

[21] Appl. No.: 443,047

[22] Filed: May 17, 1995

[51] Int. Cl.$^6$ ..................................................... G03B 1/00
[52] U.S. Cl. ................................................................ 354/212
[58] Field of Search ............................................... 354/212

[56] References Cited

U.S. PATENT DOCUMENTS 2,168,998  8/1939  Lindenberg .
3,423,041  1/1969  Steisslinger et al. .
3,479,940  11/1969  Nerwin .

*Primary Examiner*—Monroe H. Hayes
*Attorney, Agent, or Firm*—Peter J. Bilinski

[57] ABSTRACT

A photographic camera has a manual film drive which interconnects drivers for driving internal wind and rewind film spools in the same direction. A direction slide engages a toothed wheel in the film drive to prevent reverse rewind rotation when in a film advance position and prevent film advance motion when in a film rewind position. A film cassette actuated sensing slide includes a latch element engageable by a cooperating latch element on the direction slide when a film cassette is in place. When the direction slide is thereafter moved to the film rewind position, the latch elements latch the direction slide in the rewind position until the film is rewound and the cassette is removed from the camera.

7 Claims, 2 Drawing Sheets

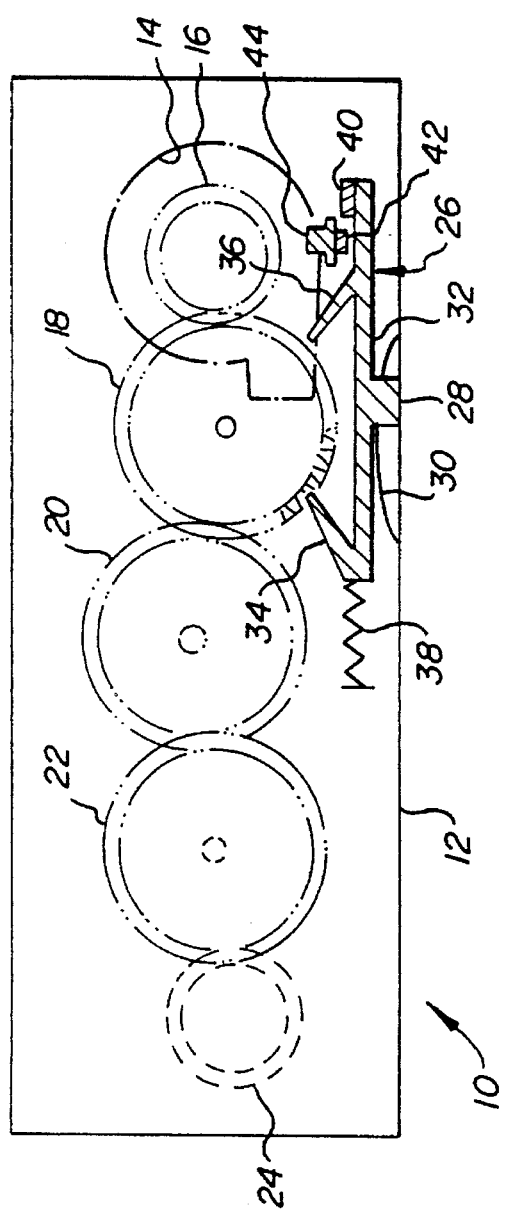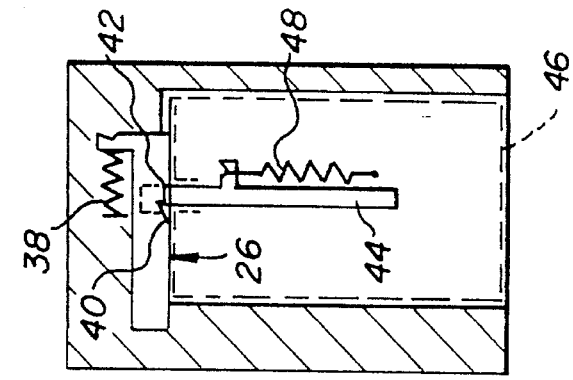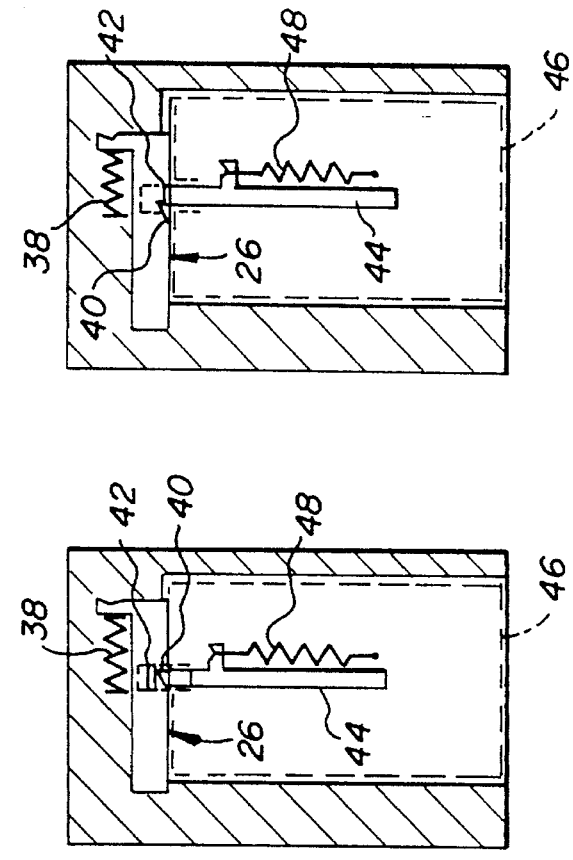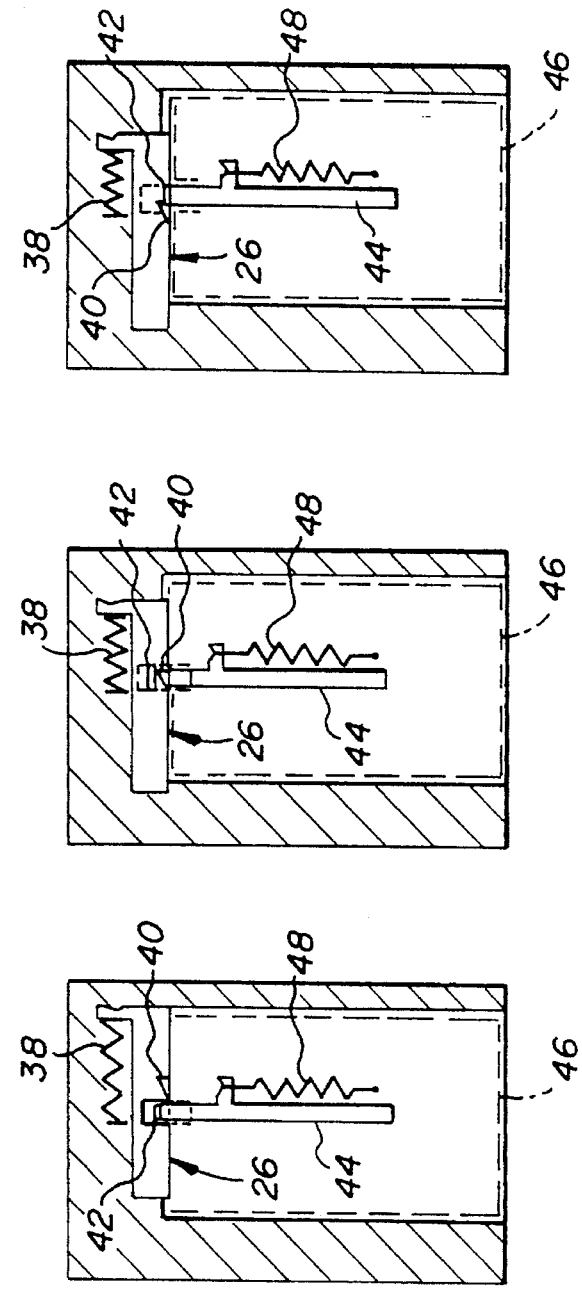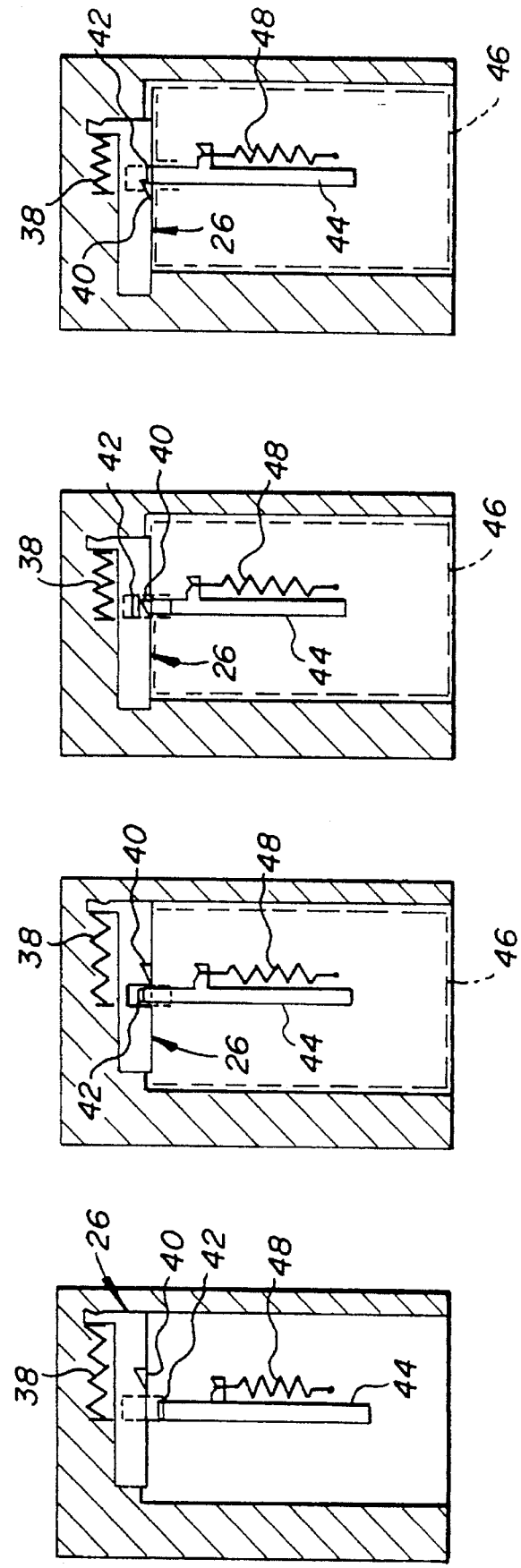

CAMERA WITH MANUAL FILM DRIVE CONTROL AND SELF RESETTING REWIND LATCH

FIELD OF THE INVENTION

This invention relates to camera film drives and more particularly to a manual film drive control including a self resetting rewind latch.

BACKGROUND OF THE INVENTION

The art pertaining to photographic cameras includes various examples of film drive mechanisms with manual or automatic control of film direction in a film advance or rewind mode. Many of these mechanisms are complex and others are specifically intended for use in particular camera embodiments.

Certain recently developed cassette load cameras have been developed to utilize a film thrusting cassette which is end loaded through a door of the camera and is thrust out of the cassette into engagement with a winder spool or drum at the opposite end of the camera body. To coordinate action of the cassette film spool and the winder spool, the driving lugs or hubs for these spools are connected by a gear train with an odd number of gears to provide same direction rotation of the two spools. For manually actuated versions of such cameras, it is desirable to provide a film drive control that is set in a film advancing mode when the cassette is inserted and is changed by the operator to a rewind mode to allow the film to be wound back into the cassette at the user's convenience. The rewind mode should be maintained until the film is completely wound into the cartridge and the cartridge has been removed from the camera.

SUMMARY OF THE INVENTION

The present invention provides a camera having manual film drive control and a self resetting rewind latch for the directional control that provides the desired functions. In a preferred embodiment, the camera film drive includes a direction switch in the form of a direction slide having resilient arms. The arms selectively engage the teeth of one of the drive gears and provide a ratchet action to selectively establish the direction of gear train and spool rotation in either a film advance or rewind mode. The direction slide is biased toward the film advance mode and is so positioned prior to installation of a film cassette. A film presence sensor, in the form of a sensing slide biased toward a non-operative position, is actuated by installation of a film cassette to an operative position adjacent a direction slide latching element. When the direction slide is moved to the rewind position, latching elements on the direction slide and locking slide engage and latch the direction slide in the rewind position. The direction slide remains latched until the film is rewound and the cassette is removed from the camera. This allows the sensing slide to move to the non-operating position and frees the direction slide for return to the film advance position, ready for insertion of another film cassette.

These and other features and advantages of the invention will be more fully understood from the following detailed description of the invention taken together with the accompanying drawings.

BRIEF DESCRIPTION OF THE DRAWINGS

In the drawings:

FIG. 1 is a schematic plan view of pertinent portions of a camera film drive according to the invention;

FIGS. 2 and 3 are respectively front and side views of the drive latching mechanism prior to installation of a film cassette;

FIGS. 4 and 5 are views similar to FIGS. 2 and 3 but showing the mechanism in the film advance position after installation of the cassette.

FIGS. 6 and 7 are views similar to FIGS. 4 and 5 but showing the direction slide being moved to the rewind position; and FIGS. 8 and 9 are similar to FIGS. 6 and 7 but showing the direction slide latched in the rewind position.

DETAILED DESCRIPTION OF THE INVENTION

Figure 9:
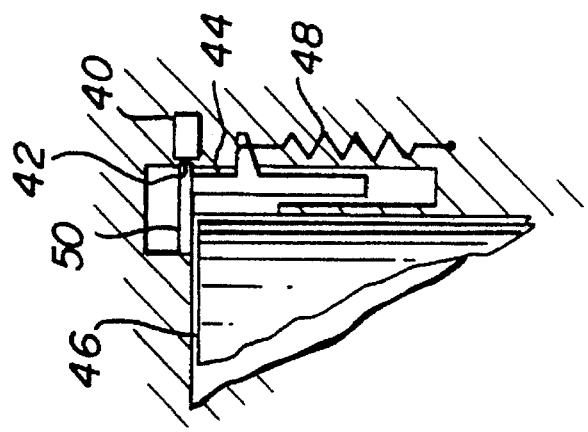

Referring first to FIG. 1 of the drawing in detail, numeral 10 generally indicates a photographic camera having a body 12 for receiving a film cassette not shown. A film drive for the camera includes a rewind drive gear 16 having a spool driver, not shown, that is connectable with a film spool within a cassette to be installed in the cavity 14. The rewind drive gear 16 engages a series of idler gears 18,20,22 which in turn engage an advance drive gear 24 connected internally with a film winding spool or drum not shown. The gear train 18,20,22 connects the drive gears 16,24 for rotation in the same direction. Manual winder means connected with the drive gears 16,24 allow the operator to rotate the drive gears clockwise to advance the film out of the film cassette or counterclockwise to rewind the film into the film cassette.

The film drive also includes a direction control switch in the form of a direction slide 26. Slide 26 has a finger engageable button 28 extending into a recess 30 of the camera body 12. The button 28 is integral with an elongated slidable bar 32 having longitudinally spaced resilient arms 34,36 extending angularly forward from the bar 32. A compression spring 38 urges the slide 26 rightward, normally forcing arm 34 against the teeth of the idler gear 18 so that the arm 34 acts as a ratcheting member, preventing clockwise rotation of the gear 18. Since the idler gear 18 rotates counterclockwise when the drive gears 16,24 are rotating clockwise to advance the film, the spring 38 urges the slide 26 in a direction to establish the film drive for movement only in a film advancing direction.

The camera operator may, when desired, move the direction slide 26 to the left, against the bias of spring 38, to a rewind position in which arm 34 is disconnected from gear 18 and arm 36 engages the teeth of the gear 18. In this position, arm 36 acts as a ratcheting member, preventing motion in the film advancing direction and allowing only film travel in the rewind direction.

The film drive also includes means to temporarily latch the direction slide 26 in the rewind position. These latching means include a wedge shaped latch element 40 on the direction slide 26, protruding forward from the bar 32, and a cooperating rectangular latch element 42 protruding rearward from a sensing slide 44. The sensing slide, best illustrated in FIGS. 2 and 3 through 8 and 9, comprises a sensor actuated by the presence of a film cartridge.

Figure 3:
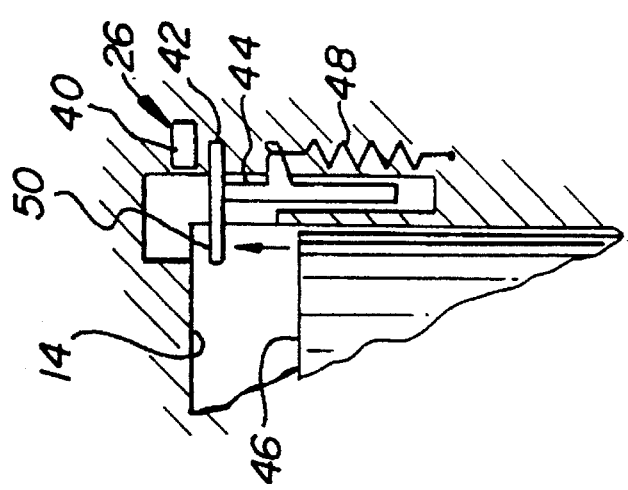

FIGS. 2 and 3 illustrate the positions of the drive control members prior to full installation of a film cassette 46 in the camera. The direction slide 26 is biased rightward into the film advance position. The sensing slide 44 is biased downward by a tension spring 48 connected between the slide 44 and the camera body. A positioning tab 50 extends from the sensing slide 44 into the cassette cavity 14 in position to be contacted by the film cassette 46 when fully installed. The rectangular latch element 42 extends from the slide 44 into a position adjacent to the wedge shaped latch element 40 of the direction slide 26.

Figure 7:
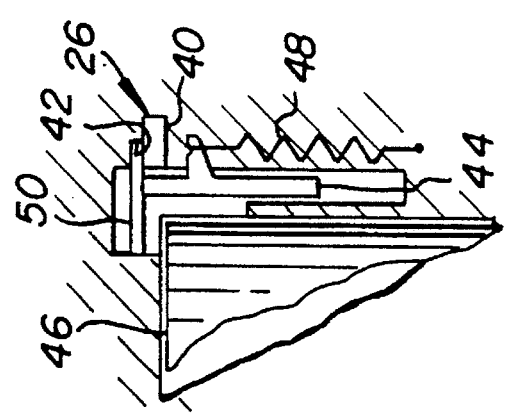
Figure 5:
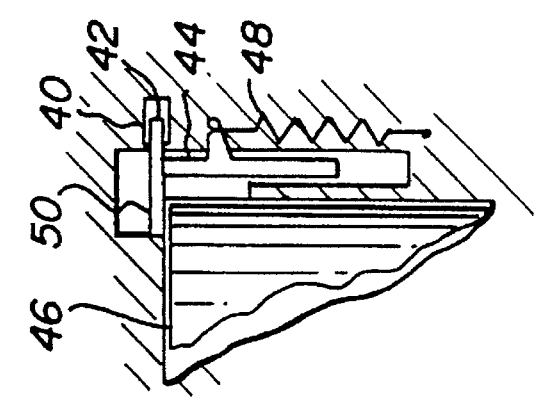

When cassette 46 is fully installed as shown in FIGS. 4 and 5, it engages the tab 50, forcing the sensing slide 44 upward against the tension of spring 48 to a position where the rectangular latch element 42 is laterally aligned with the wedge latch element 40. Thereafter, when the film is exposed, the operator moves the direction slide 26 leftward toward the rewind position. This causes the wedge element 40 to engage the rectangular element 42 and, as the direction slide 26 is moved further toward the rewind position, to lift the rectangular element 42, raising the slide 44 further until the wedge element 40 slides underneath rectangular element 42 as shown in FIGS. 6 and 7. Further leftward movement of slide 26 to the rewind position, causes the wedge element 40 to move beyond the rectangular element 42, allowing the sensing slide 44 to be drawn downward by spring 48 to the latched position shown in FIGS. 8 and 9. In this position, the rectangular element 42 blocks return movement of the wedge element 40, holding the direction slide 26 in the rewind position.

This latching function is maintained until the film is fully rewound and the cassette 46 is removed from the camera. As the cassette is moved away from tab 50, the sensing slide 44 is released and drawn downward by the tension spring 48 to its inoperative position shown in FIGS. 2 and 3. This also moves the rectangular latch element 42 downward and out of its position blocking the wedge element 40 which then allows the direction slide 26 to be returned by the biasing spring 8 to the film advance position shown in FIGS. 1, 2, and 3.

The cooperative action of the direction slide 26 and the sensing slide 44 thus establishes the film drive in the film advance direction prior to installation of a film cassette. Thus, when a cassette is installed, the operator may manually advance the film through each of the photo positions until the complete film is exposed. Movement of the direction slide 26 to the rewind position then latches the drive in the rewind mode until the film is fully rewound and the cassette is removed from the camera. Then the drive is returned to the film advance position, ready to receive the next film cassette.

Although the invention has been described by reference to specific embodiment, it should be understood that numerous changes may be made within the spirit and scope of the inventive concepts described. Accordingly, it is intended that the invention not be limited to the described embodiment, but that it have the full scope defined by the language of the following claims.

| Parts List |
| --- |
| 10. camera |
| 12. body |
| 14. cavity |
| 16. rewind drive gear |
| 18. idler gear |
| 20. idler gear |
| 22. idler gear |
| 24. advance drive gear |
| 26. direction slide |
| 28. button |
| 30. recess |
| 32. bar |
| 34. arm |
| 36. arm |
| 38. compression spring |
| 40. wedge shaped latch element |
| 42. rectangular latch element |
| 44. sensing slide |
| 46. film cassette |

| Parts List |
| --- |
| 48. tension spring |
| 50. positioning tab |

What is claimed is:

1. A photographic camera having a manual film drive characterized by:

a direction switch movable between a film advance mode and a film rewind mode and biased toward the advance mode; and a film presence sensor responsive to loading a film into the camera to effectuate a latch, operative to maintain the direction switch in the rewind mode upon movement thereto while a film is present, said sensor being responsive to removal of the film from the camera to release the latch, allowing return of the direction switch to the advance mode.

2. The invention as in claim 1 characterized by biasing means urging the direction switch toward the film advance mode.

3. The invention as in claim 1 characterized in that said switch is a direction slide biased toward an advance position corresponding to the advance mode and movable to a rewind position corresponding to the rewind mode and said sensor is a sensing slide biased toward a non-operative position and movable to an operative position upon engagement by a film cassette loaded into the camera, said latch including coacting latch features on said slides that engage when the sensing slide is in the operative position and the direction slide is moved to the rewind position and that disengage when the sensing slide is moved to the nonoperative position.

4. The invention as in claim 1 wherein said film drive includes a toothed wheel connecting first and second film spool drivers within the camera and operative to rotate the wheel in one direction when the film is advanced and to rotate the wheel in an opposite direction when the film is rewound, characterized by:

a first ratcheting member supported by said switch and operatively engaging said toothed wheel when the switch is in the advance mode to prevent film rewind motion of the film drive; and a second ratcheting member supported by said switch and operatively engaging said toothed wheel when the switch is in the rewind mode to prevent advancing motion of the film drive.

5. The invention as in claim 4 characterized in that said switch is a direction slide biased toward an advance position corresponding to the advance mode and movable to a rewind position corresponding to the rewind mode.

6. The invention as in claim 5 characterized in that said ratcheting members are first and second resilient arms integrally formed with said direction slide and spacedly related thereon.

7. The invention as in claim 6 characterized in that said sensor is a sensing slide biased toward a non-operative position and movable to an operative position upon engagement by a film cassette loaded into the camera, said latch including coacting latch features on said slides that engage when the sensing slide is in the operative position and the direction slide is moved to the rewind position and that disengage when the sensing slide is moved to the non-operative position.

* * * * *